United States Patent [19]

Morris

[11] Patent Number: 5,383,422
[45] Date of Patent: Jan. 24, 1995

[54] DISPOSABLE CARDBOARD DOGHOUSE OF COLLAPSIBLE CONSTRUCTION

[76] Inventor: Rosie L. Morris, P.O. Box 793, LaMarque, Tex. 77568

[21] Appl. No.: 197,333

[22] Filed: Feb. 16, 1994

[51] Int. Cl.6 .................................................. A01K 1/03
[52] U.S. Cl. ....................................... 119/19; 119/168
[58] Field of Search ......................... 119/19, 168, 165; 229/103, 122, 108, 117.08

[56] References Cited

U.S. PATENT DOCUMENTS

| | | | |
|---|---|---|---|
| 3,016,042 | 1/1962 | Curn, Jr. | 119/19 |
| 4,295,446 | 10/1981 | Voss | 119/19 |
| 4,520,758 | 6/1985 | Pfriender | 119/19 |
| 4,940,016 | 7/1990 | Heath | 119/168 |

FOREIGN PATENT DOCUMENTS 2618050  1/1989  France ..................... 119/168

Primary Examiner—Todd E. Manahan

[57] ABSTRACT

A disposable doghouse of a collapsible construction comprises a single piece of material with a bottom section having front and rear short sides and long sides and with additional flaps integral therewith. The additional flaps include two side flaps integral with the long sides. Each side flap consists of a side section integral with the bottom section at one end and a roof section at the other end. The side section has lateral edges and inboard and outboard edges and the roof section has lateral edges and inboard and outboard sections. The additional flaps also include a front flap integral with a front side of the bottom section, comprised of plural sides including two lateral sides perpendicular to the bottom section, integral with diagonal sides set at an angle to the lateral sides of the back section and integral with a short side at the far end. The front flap also includes a door. The additional flaps include a back flap integral with one side of the bottom section, consisting of a back section and roof section. The back section consists of two sides perpendicular to the bottom section with two sides set at an angle to the adjacent sides, integral with the roof section's long sides.

6 Claims, 3 Drawing Sheets

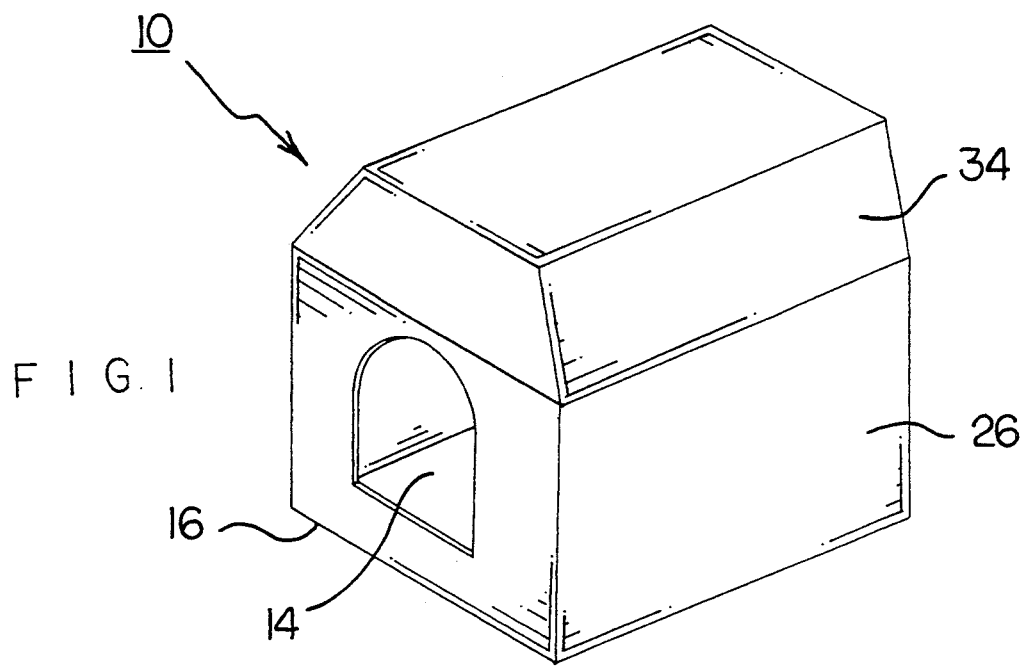
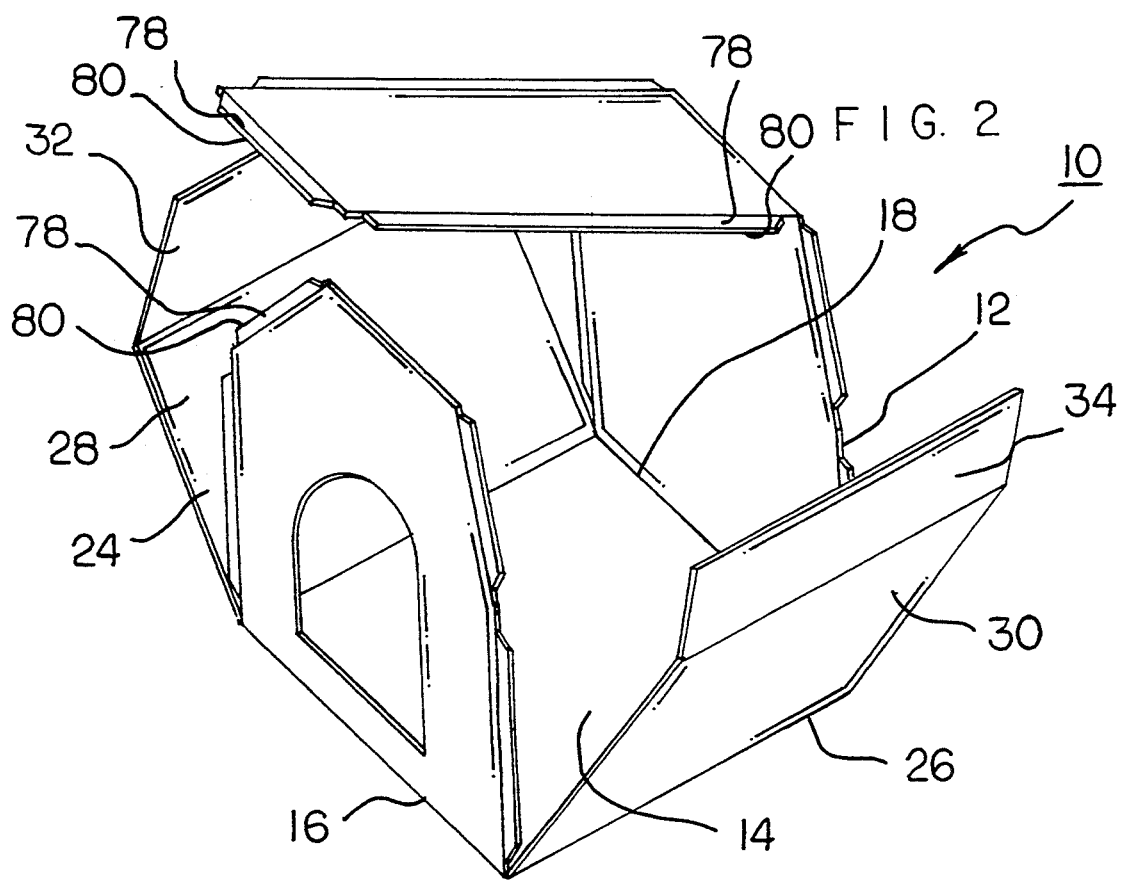

DISPOSABLE CARDBOARD DOGHOUSE OF COLLAPSIBLE CONSTRUCTION

BACKGROUND OF THE INVENTION

1. Field of the Invention

The present invention relates to disposable cardboard doghouses of a collapsible construction and more particularly pertains to assembling and collapsing reusable houses for indoor pets which are of a lightweight, one-piece design.

1. Description of the Prior Art

The use of portable pet houses is known in the prior art. More specifically, portable pet houses heretofore devised and utilized for the purpose of providing pets with portable and/or collapsible houses to consist basically of familiar, expected, and obvious structural configurations, notwithstanding the myriad of designs encompassed by the crowded prior art which has been developed for the fulfillment of countless objectives and requirements.

The prior art discloses various types of doghouses. By way of example, U.S. Pat. No. 4,391,223 to Holland discloses a cardboard house for pets.

U.S. Pat. No. 4,006,713 to Hawley discloses a collapsible dog house.

U.S. Pat. No. 4,195,593 to Dunn discloses a portable dog house.

U.S. Pat. Des. Nos. 317,665 to Marshall and 257,493 to Lodrick disclose ornamental designs for doghouses.

In this respect, the disposable cardboard doghouses of a collapsible construction according to the present invention substantially depart from the conventional concepts and designs of the prior art, and in doing so provide an apparatus primarily developed for the purpose of assembling and collapsing reusable houses for indoor pets which are of a lightweight, one-piece design.

Therefore, it can be appreciated that there exists a continuing need for new and improved disposable cardboard doghouses of a collapsible construction which can be used for assembling and collapsing reusable houses for indoor pets which are of a lightweight, one-piece design. In this regard, the present invention substantially fulfills this need.

SUMMARY OF THE INVENTION

In view of the foregoing disadvantages inherent in the known types of portable pet houses now present in the prior art, the present invention provides improved disposable cardboard doghouses of a collapsible construction. As such, the general purpose of the present invention, which will be described subsequently in greater detail, is to provide a new and improved disposable cardboard doghouse of a collapsible construction and method which has all the advantages of the prior art and none of the disadvantages.

To attain this, the present invention essentially comprises a new and improved disposable cardboard doghouse of a collapsible construction comprising, in combination, a single piece of sturdy cardboard with a bottom section having front and rear short sides measuring about 17½ inches and having long sides measuring about 20 inches and with additional flaps integral with the sides of the bottom section; the additional flaps including two side flaps integral with the long sides of the bottom section, each side flap consisting of a side section integral with the bottom section at one end and a roof section at the other end, demarcated by perforated lines, the side section having lateral edges measuring about 16½ inches and inboard and outboard edges measuring about 20 inches and the roof section having lateral edges measuring about 20 inches and inboard and outboard sections measuring about 8½ inches; the additional flaps also including a front flap integral with a front side of the bottom section, comprised of six sides including two lateral sides perpendicular to the bottom section measuring about 16½ inches, integral with two about 8½ inch diagonal sides set at about a 45 degree angle to the lateral sides of the back section and integral with about a 2½ inch side at the far end, the front flap also including a pre-cut door formed entirely within the front flap, the door having a rounded top located about 5½ inches from the 2½ inch far end and about 5 inches from the 17½ inch bottom section; the additional flaps including a back flap integral with a 17½ inch side of the bottom section, consisting of a back section and roof section, the back section consisting of two about 16½ inch sides perpendicular to the bottom section with two about 8½ inch sides set at about a 45 degree angle to the 16½ inch sides, integral with the roof section's 20 inch sides which are about 5½ inches in width; and reusable adhesive along at least some of the edges of the cardboard to secure the edges in an operative orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved disposable cardboard doghouses of a collapsible construction which have all the advantages of the prior art portable pet houses and none of the disadvantages.

It is another object of the present invention to provide new and improved disposable cardboard doghouses of a collapsible construction which may be easily and efficiently manufactured and marketed.

It is a further object of the present invention to provide new and improved disposable cardboard doghouses of a collapsible construction which are of durable and reliable constructions.

An even further object of the present invention is to provide new and improved disposable cardboard doghouses of a collapsible construction which are susceptible of a low cost of manufacture with regard to both materials and labor, and which accordingly are then susceptible of low prices of sale to the consuming public, thereby making such disposable cardboard doghouses of a collapsible construction economically available to the buying public.

Still yet another object of the present invention is to provide new and improved disposable cardboard doghouses of a collapsible construction which provide in the apparatuses and methods of the prior art some of the advantages thereof, while simultaneously overcoming some of the disadvantages normally associated therewith.

Still another object of the present invention is to provide cardboard houses for indoor pets which are easy to assemble and transport due to lightweight, one-piece design.

Lastly, it is an object of the present invention to provide a disposable doghouse of a collapsible construction comprising a single piece of material with a bottom section having front and rear short sides and having long sides and with additional flaps integral with the sides of the bottom section; the additional flaps including two side flaps integral with the long sides of the bottom section, each side flap consisting of a side section integral with the bottom section at one end and a roof section at the other end, demarcated by fold lines, the side section having lateral edges and inboard and outboard edges and the roof section having lateral edges and inboard and outboard sections; the additional flaps also including a front flap integral with a front side of the bottom section, comprised of plural sides including two lateral sides perpendicular to the bottom section, integral with diagonal sides set at an angle to the lateral sides of the back section and integral with a short side at the far end, the front flap also including a pre-cut door formed entirely within the front flap; and the additional flaps including a back flap integral with one side of the bottom section, consisting of a back section and roof section, the back section consisting of two sides perpendicular to the bottom section with two sides set at an angle to the adjacent sides, integral with the roof section's long sides.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of a disposable cardboard doghouse of a collapsible construction constructed in accordance with the principles of the present invention.

FIG. 2 is a perspective view of the disposable cardboard doghouse partially disassembled.

The same reference numerals refer to the same parts throughout the various Figures.

DESCRIPTION OF THE PREFERRED EMBODIMENT

Figure 3:
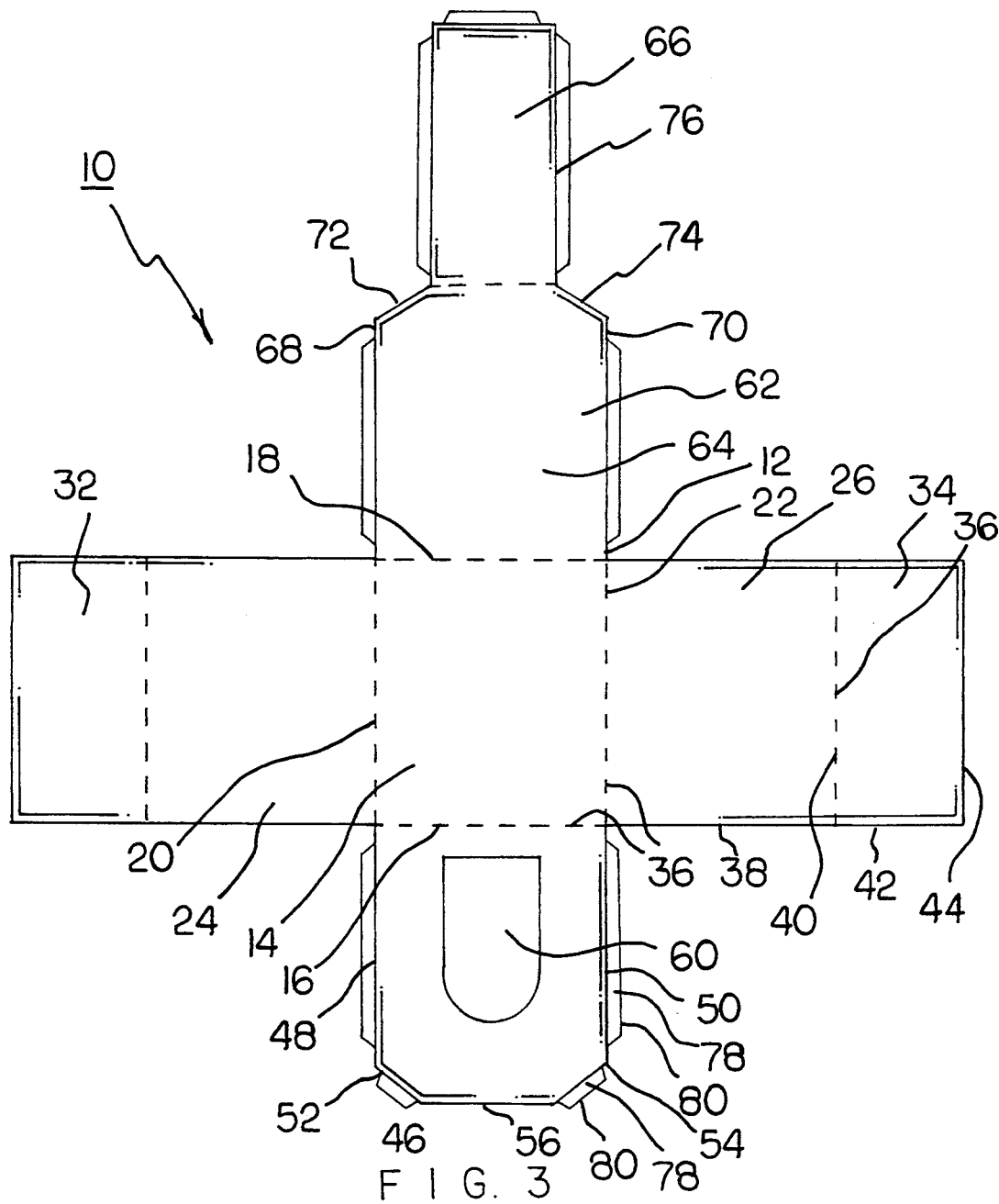
FIG. 3 is a top plan view of a completely disassembled disposable cardboard doghouse.

With reference now to the drawings, and in particular to FIG. 1 thereof, the preferred embodiment of the new and improved disposable cardboard doghouse embodying the principles and concepts of the present invention and generally designated by the reference numeral 10 will be described.

Figure 4:
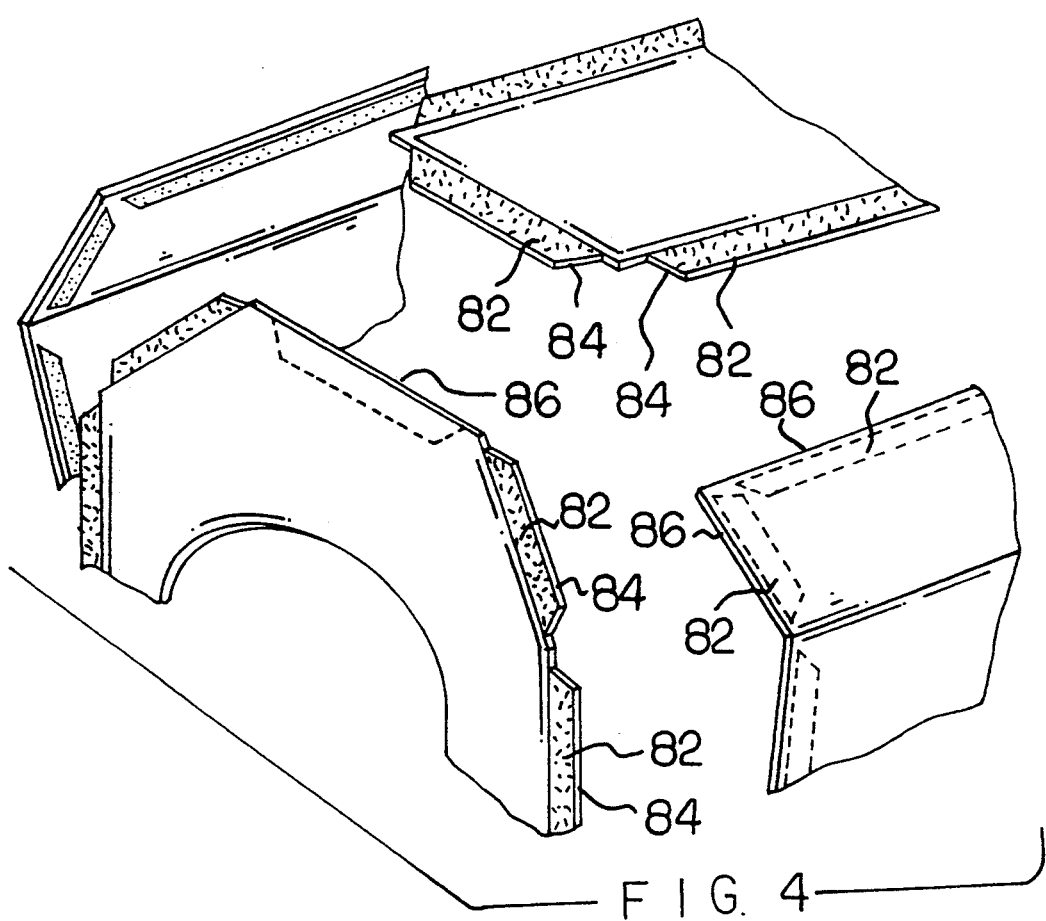
FIG. 4 is a doghouse constructed in accordance with an alternate embodiment of the invention.

Specifically, it will be noted in the FIGS. 1 through 3 as well as FIG. 4 that there is provided a new and improved disposable cardboard doghouse of a collapsible construction. The doghouse 10, in its broadest context, comprises a single piece of sturdy cardboard or other suitable material with a bottom section and four flaps as well as a coupling means around the perimeters of the side edges holding the sections together.

More specifically, the basic component of the doghouse 10 is a single piece of sturdy cardboard 12. Centrally located in the cardboard is a bottom section 14. The bottom section has front and rear short sides 16 and 18. Such sides measure about 17½ inches. The bottom section also has long sides 20 and 22 measuring about 20 inches. In addition to the bottom section, the cardboard includes additional flaps formed integrally with the sides of the bottom section.

The additional flaps include two side flaps 24 and 26 integral with the long sides of the bottom section. Each side flap consists of a side section 28 and 30 integral with the bottom section at one end and also includes a roof section 32 and 34 at the other end. Perforated lines demarcate these two sections. The side sections have lateral edges 38 measuring about 16½ inches with inboard and outboard edges 40 measuring about 20 inches. The roof section has lateral edges 42 measuring about 20 inches and inboard and outboard sections 44 measuring about 8½ inches.

The additional flaps also include a front flap 46 integral with a front side of the bottom section. Such front flap is comprised of five sides. Such five sides include two lateral sides 48 and 50 perpendicular to the lateral bottom section which measure about 16½ inches. Integral therewith are two 8½ inch diagonal sides 52 and 54 set at about 45 degrees with respect to the lateral sides of the back section. Integral therewith are a pair of 2½ inch sides 56 at the far end.

The front flap also includes a pre-cut door 60 formed entirely within the front flap. Such door has a rounded top located about 5½ inches from the far end of its panel and 5 inches from the bottom section.

Lastly, the additional flaps include a back flap 62 integral with a 17½ inch side of the bottom section. The back flap consists of a back section 64 and a roof section 66. The back section consists of two 16½ inch sides 68 and 70 perpendicular to the bottom section with two 8½ inch sides 72 and 74 set at about 45 degrees with respect to the 16½ inch sides. Formed integral therewith is the roof section which has 20 inch sides 76 which are about 5½ inches in width.

Coupling between the various sections is through an adhesive 78, preferably a commercially available reusable adhesive. Such adhesive is placed on tabs 80 secured to at least some of the edges of the various sections as shown. Such tabs with adhesives are adapted to couple with adjacent edges of other portions of the cardboard to form the completed doghouse.

An alternate embodiment of the invention is shown in FIG. 4. According to such alternate embodiment, the coupling means between the various sections of the doghouse is through a pile-type fastener 82 commercially available as Velcro. In such situation, the pile-type fastener is located on tabs 84 and adjacent areas. Such pile-type fastener thus has one component thereof on the tabs and another component thereof on the associated cardboard areas 86 where the coupling therebetween is to be made.

The doghouse is constructed by folding the front flap upward so as to rest perpendicular to the bottom section. The two side flaps are then folded upward so as to rest perpendicular to the bottom section with the side sections of the side flaps adjoining the side edges of the front flap. The roof sections of the side flaps are then folded over so as to adjoin the approximately 45 degree angled edges of the front flap. The back flap of the doghouse is then folded upward so that the side section rests perpendicular to the bottom section and the approximately 45 degree angled edges of the doghouse adjoin the roof section of the side flaps. The roof section of the back flap is then folded over the top of the doghouse so as to rest parallel to the bottom section, while adjoining the roof sections of the side flaps and the top edge of the front flap. The flaps are held together by coupling means located around the perimeter of all of the flaps' free edges.

This is a disposable doghouse, made of sturdy cardboard. This doghouse was designed in one whole piece so it can be set up without any difficulty. The perforated seams allow the pet owner to bend and shape the house. The adhesive flaps allow for sealing the edges and roof. The door is precut.

This doghouse was designed to be used indoors. This house is for owners whose pets live indoors. It is a dog's instinct to try to find something to crawl underneath. Mother Nature supplied them with a den, but since we have domesticated these animals, this cardboard house suits their purpose well. Dogs love this house and are less likely to spend their time underneath beds or tables. Rather, they will make a habit of staying in this house.

This house is lightweight and easy to set up. It can be moved from one room to another without any difficulty. It can also be folded and packed away for traveling. This house is ideal for pet owners who want their dogs to experience the feeling of the closest thing to a den indoors, in the privacy of their own home. No one would set a heavy wooden doghouse up in their home, but they would think again if it was lightweight and movable.

The cages used today to transport animals do not compare with this house. Dogs do not willingly enter these cages because they feel trapped. With the present invention, they go in willingly because they feel this is home for them.

Finally, this house is made of inexpensive material so when it is worn out, it can be discarded easily, and it is inexpensive to replace.

The house is folded where the perforated seams are showing, and the edges and roof are sealed where adhesive flaps are showing. This house is presented in one whole piece and all one has to do is fold it together and seal it.

This pattern is cut from one large piece of sturdy cardboard. Following the dimensions on the diagram, cut according to the measurements that are printed out. Then cut medium size doorway in center front. After cutting out the doghouse, perforations should be made where indicated so the sections can be bent where arrows indicate. Adhesive flaps are made where indicated. When assembling the house, the flaps can be hot glued, if one is not planning on taking it down.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form and function and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved disposable cardboard doghouse of a collapsible construction comprising:

a single piece of sturdy cardboard with a bottom section having front and rear short sides measuring about 17½ inches and having long sides measuring about 20 inches and with additional flaps integral with the sides of the bottom section;

the additional flaps including two side flaps integral with the long sides of the bottom section, each side flap consisting of a side section integral with the bottom section at one end and a roof section at the other end, demarcated by perforated lines, the side section having lateral edges measuring about 16½ inches and inboard and outboard edges measuring about 20 inches and the roof section having lateral edges measuring about 20 inches and inboard and outboard sections measuring about 8½ inches;

the additional flaps also including a front flap integral with a front side of the bottom section, comprised of six sides including two lateral sides perpendicular to the bottom section measuring about 16½ inches, integral with two about 8½ inch diagonal sides set at about a 45 degree angle to the lateral sides of the front section and integral with about a 2½ inch side, the front flap also including a pre-cut door formed entirely within the front flap, the door having a rounded top located about 5½ inches from the 2½ inch far end and about 5 inches from the 17½ inch bottom section;

the additional flaps further including a back flap integral with the rear side of the bottom section, consisting of a back section and roof section, the back section consisting of two about 16½ inch sides perpendicular to the bottom section with two intermediate about 8½ inch sides set at about a 45 degree angle to the 16½ inch sides, integral with the lateral edges of the roof which are about 5½ inches in width; and reusable adhesive along at least some of the edges of the cardboard to secure the edges in an operative orientation.

2. A disposable doghouse of a collapsible construction comprising:

a single piece of material with a bottom section having front and rear short sides and having long sides and with additional flaps integral with the sides of the bottom section;

the additional flaps including two side flaps integral with the long sides of the bottom section, each side flap consisting of a side section integral with the bottom section at one end and a roof section at the other end, demarcated by fold lines, the side section having lateral edges and inboard and outboard edges and the roof section having lateral edges and inboard and outboard sections;

the additional flaps also including a front flap integral with a front side of the bottom section, comprised of plural sides including two lateral sides perpendicular to the bottom section, integral with diagonal sides set at an angle to the lateral sides of the front section and integral with a short side, the front flap also including a pre-cut door formed entirely within the front flap; and the additional flaps further including a back flap integral with the rear side of the bottom section, consisting of a back section and roof section, the back section consisting of two long sides perpendicular to the bottom section with two intermediate sides set at an angle to the long sides, integral with the roof section.

3. The doghouse as set forth in claim 2 and further including:

a coupling means along at least some edges.

4. The doghouse as set forth in claim 3 wherein the coupling means is an adhesive.

5. The doghouse as set forth in claim 4 wherein the coupling means is reusable.

6. The doghouse as set forth in claim 3 wherein the edges are coupled through a pile-type fastener.

* * * * *